United States Patent [19]

Rapoza

[11] Patent Number: 5,110,307
[45] Date of Patent: May 5, 1992

[54] LASER WELDABLE HERMETIC CONNECTOR

[75] Inventor: Edward J. Rapoza, West Milford, N.J.

[73] Assignee: Balo Precision Parts Inc., Butler, N.J.

[21] Appl. No.: 727,668

[22] Filed: Jul. 9, 1991

[51] Int. Cl.$^5$ .............................. H01R 13/74
[52] U.S. Cl. ................... 439/566; 29/843; 174/152 GM
[58] Field of Search ............ 439/566; 29/842, 843; 174/50, 61, 151, 152 GM

[56] References Cited

U.S. PATENT DOCUMENTS

| | | |
|---|---|---|
| 4,103,619 | 8/1978 | Fletcher et al. |
| 4,136,603 | 1/1979 | Doyle, Jr. |
| 4,657,337 | 4/1987 | Kyle ............ 174/152 GM X |
| 4,690,480 | 9/1987 | Snow et al. |
| 4,934,952 | 6/1990 | Banker |

OTHER PUBLICATIONS

Explosive Fabricators, Inc., Trade Literature "The Light Weight of Aluminum and the Seam Sealability of KOVAR", *Microwave Journal*, p. 141 (Feb. 1991).
Explosive Fabricators, Inc., Trade Literature "The Most Powerful Name in Metal Fabrication Technology" (Jul., 1989).
Explosive Fabricators, Inc., Trade Literature "EFTEK Explosion-Clad Materials for Power Hybrid and Microwave Packaging" (undated).

*Primary Examiner*—Eugene F. Desmond
*Attorney, Agent, or Firm*—Synnestvedt & Lechner

[57] ABSTRACT

Electrical connectors are provided for enabling electrical access through a side wall of a microelectronic, sensor, or fiber optic package housing while maintaining hermeticity. These connectors include a connector body having an aperture therethrough and a coefficient of thermal expansion which is different than that of the housing. The connectors include a connector pin disposed through the aperture of the connector body and hermetically sealed to the connector body with an insulating composition or a ceramic insert bonded to the connector pins. Flange means are also provided for joining the hermetic electrical connector to the microelectronic package housing. The flange means includes upper and lower flanges metallurgically bonded together and comprising first and second metallic compositions respectively. The first composition is hermetically bonded to the connector body with a fusion weld having a heat-affected-zone which does not significantly affect the hermetic seals around the connector pins. The second metallic composition is readily weldable to the microelectronic package housing to provide the final hermetic coupling.

27 Claims, 2 Drawing Sheets

LASER WELDABLE HERMETIC CONNECTOR

FIELD OF THE INVENTION

This invention relates to electrical connectors, and more particularly, to manufacturing methods for maintaining hermeticity and providing metallurgical compatibility between connectors and microelectronic housings.

BACKGROUND OF THE INVENTION

Microelectronic modules, such as those containing electronic circuit components, fiber optics, or pressure sensing devices, rely on hermetic sealing, i.e., gas-tight seals, to protect these sensitive components from the corrosive effects of the environment. As is often the case, these modules contain a mosaic of materials having various, and often less than compatible, physical properties.

The art has typically relied upon hermetic connectors disposed through a side wall of the housings of such modules to provide input-output electrical access for cables and the like. In the past, such connectors included a connector body made of a low coefficient of thermal expansion, Fe-Ni-Co alloy, such as Kovar ®, and one or more connector pins axially disposed through the connector body. These pins are usually hermetically sealed with glass through small pin-receiving holes disposed through the center of the connector body. The glass insulates the pins from the rest of the connector and is relatively compatible with the Kovar ® base metal, so as to provide an air-tight hermetic fit around the connector pins during severe temperature cycles, such as those experienced by aircraft during flight.

The module housing, for a number of years, was also made of an iron-based alloy, such as Kovar ®, which enabled thermal expansion compatibility with the connector during these wide temperature cycles as well as weldability, such as by fusion welding or brazing, for providing a hermetic seal between the connector body and the housing.

With the advent of cost cutting measures, including weight reduction efforts aimed at conserving fuel in the military and commercial aircraft industries, module housings have recently been made from light weight metals, such as aluminum. Although aluminum is easier to machine, is less expensive, and is lighter in weight than iron-based alloys, it is not very compatible with Kovar ®, both in regard to weldability and thermal expansion.

In an effort to accommodate the use of aluminum housings in microelectronic modules, the art has resorted, in certain instances, to plating the connector-receiving window regions of aluminum housings and the matching surface of the Kovar ® connectors with nickel, or a similar metal, and then soldering or brazing the nickel-plated surfaces together. Since these metal joining techniques require heating the plated metal surfaces to at least about 200° C. (and as high as 360° C.), and since aluminum and Kovar ® have drastically different coefficients of thermal expansion, stress is created in the joint upon cooling the module to room temperature. Such stress can lead to joint failure and a loss of hermeticity when the module component undergoes subsequent manufacturing operations or is placed in service, especially if such service requires exposure to severe temperature cycling, for example, in aerospace applications.

SUMMARY OF THE INVENTION

Electrical connectors suitable for providing electrical access through a side wall of a microelectronic package or module and methods for preparing such connectors are provided by this invention. The connectors are designed to maintain hermeticity, or gas impermeability, throughout the manufacturing and service life of these components.

In a first embodiment of this connector, the housing of the microelectronic package includes a first coefficient of thermal expansion. The connector has a connector body having an aperture therethrough and a second coefficient of thermal expansion. A connector pin is disposed through the aperture in the connector body and hermetically sealed to the connector body with an insulating composition. In an important aspect of this invention, flange means are provided for joining the hermetic electrical connector to the housing. The flange means includes upper and lower flanges metallurgically bonded together and comprising first and second metallic compositions respectively. The first composition is hermetically bonded to the connector body, preferably by fusion welding thereto, and is metallurgically compatible (i.e., Kovar ® to Kovar ®, stainless steel to Kovar ®, Kovar ® to stainless steel, stainless steel to stainless steel, etc.). This fusion weld is produced by progressive spot laser welding or progressive spot resistance welding having a heat-affected-zone ("HAZ") small enough such that it does not significantly affect the hermeticity provided by the insulating composition, i.e., glass or ceramic. The second layer is similarly compatible with the housing package, (i.e., aluminum to aluminum, etc.).

Accordingly, this invention provides sound hermetic joints between Kovar ® connectors or iron or steel connectors and aluminum modules (or zinc modules, or titanium modules, etc.) by employing cladded flange members and low HAZ welding procedures. Unreliable soldering or brazing techniques can be avoided altogether, thus minimizing resulting residual stresses to internal sensitive electronic components sensors or optics, etc. Greater reliability of the microelectronic module can be afforded by the carefully orchestrated process steps of this invention, which take into account both weldability and thermal expansion compatibility of the various sealing compositions and base metals of electrical connectors and electronic modules.

In a further embodiment of this invention, a method of manufacturing hermetic electrical connectors is provided. This method includes providing a connector body having an aperture therethrough, disposing a connector pin through the aperture and hermetically sealing this pin to the connector body with an insulating composition. A flange means is further provided by this method for joining the hermetic electrical connector to a microelectronic package housing. The flange means includes upper and lower flanges metallurgically bonded together and comprising first and second metallic compositions respectively. The first composition is weldable to the connector body with a low HAZ welding technique and the second composition is weldable to the microelectronic package housing.

In a further aspect of this invention, an electrical connector is provided for accessing a microelectronic elements within a package housing through a side wall of the housing. The connector includes a connector body having a cavity therethrough and a coefficient of thermal expansion which differs from the coefficient of thermal expansion of the housing. This connector also includes an insulating body having a pin receiving hole therein. The insulating body is hermetically sealed to the connector body and disposed substantially within its cavity. The connector further includes a pin disposed through the pin receiving hole and hermetically sealed to the insulating body and flange means for joining the hermetic electrical connector to the microelectronic package housing. The flange means, like the ones described above, includes upper and lower flanges metallurgically bonded together and comprising first and second metallic compositions respectively. The first composition is hermetically bonded to the connector body with a fusion weld having a HAZ which does not significantly affect the hermeticity between the connector pin and the insulating body, and the second composition is bonded to the microelectronic package with a fusion weld having a low HAZ, so as to provide a sound hermetic seal without high temperature brazing or soldering which are known to affect the temperature sensitive components therein.

BRIEF DESCRIPTION OF THE DRAWINGS

The accompanying drawings illustrate preferred embodiments of the invention according to the practical application of the principles thereof, and in which.

DETAILED DESCRIPTION OF THE INVENTION

This invention provides electrical connectors suitable for providing input-output access through a side wall of a microelectronic package housing while maintaining hermeticity. This connector utilizes a dual layer flange having layers of relatively incompatible metal compositions which are metallurgically bonded together, preferably by high compression cladding, without the introduction of interface stress or elevated temperatures. The upper portion of the flange of this invention contains a metallic composition which is compatible with the connector body metal. As used herein, the term "compatible" refers to an approximate matching of the metallurgical and fusion welding properties of metallic compositions.

The other portion of the flange of this invention is manufactured with a metallic Composition which is compatible to the module housing. By matching the metallic compositions, fusion welding can be employed to attach the flange to the connector body and in turn to the microelectronic package housing to provide sound, hermetic joints, which are less susceptible to stress during large temperature cycles.

Figure 1:
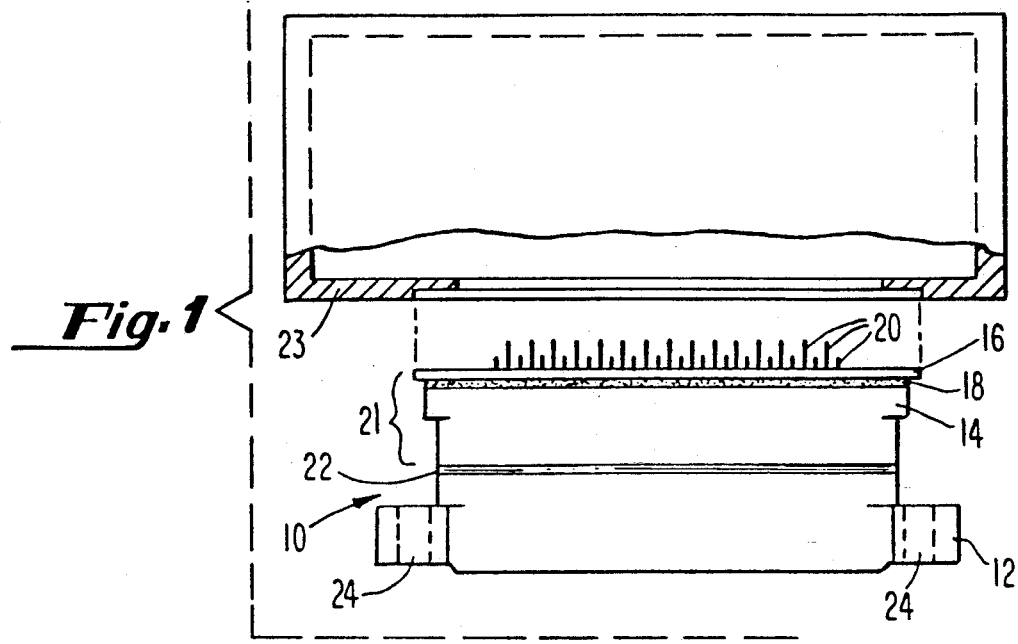
FIG. 1: is a side elevation plan view of a preferred electrical connector of this invention.
Figure 2:
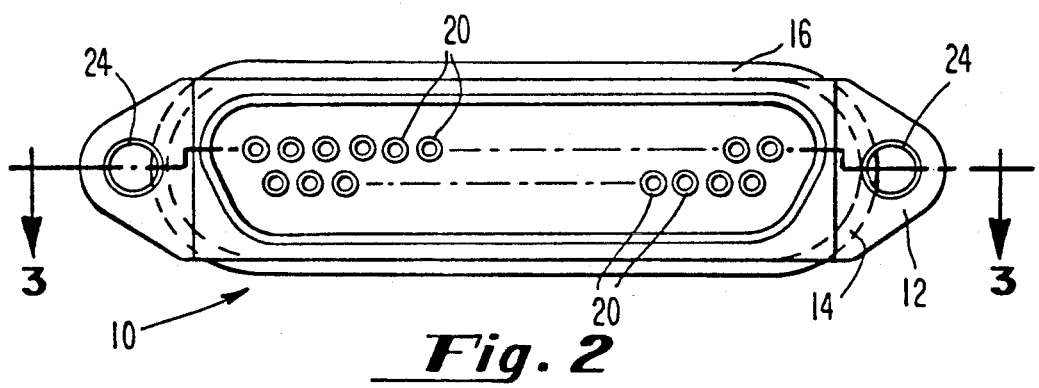
FIG. 2: is a top plan view cf the preferred electrical connector of FIG. 1.
Figure 3:
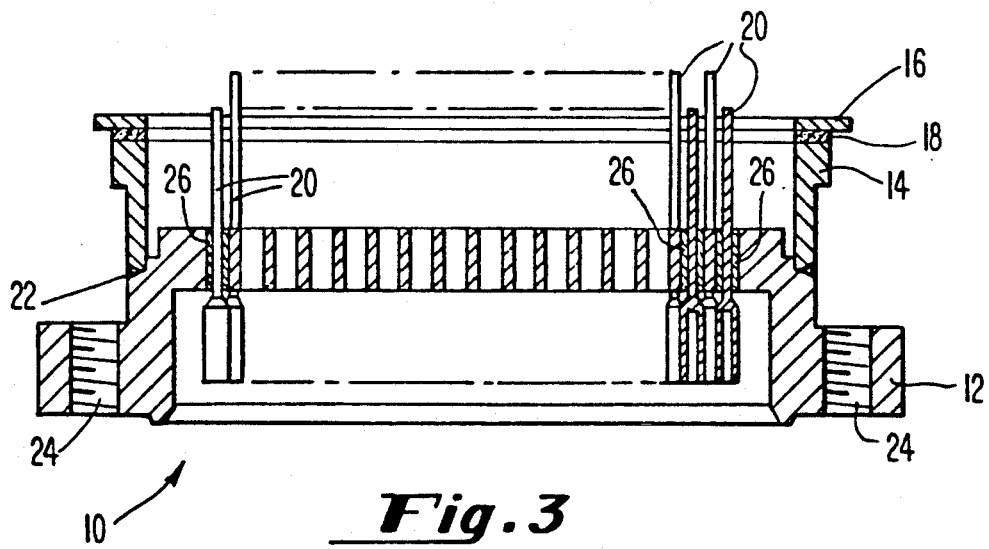
FIG. 3: is a side cross-sectional view, taken through line 3—3 of FIG. 2, illustrating the sealing of the input-output connector pins of this embodiment.

With reference to FIGS. 1—3, there is shown a preferred electrical connector of this invention. This connector 10 preferably includes a connector body 12 having a "male pinned" connector mate which can engage via a coupling flange, which preferably includes bored threaded engagement holes 24. The connector body 12 is preferably made of an iron-based alloy, more preferably a Fe-Ni-Co alloy, such as Kovar ® alloy. Alternatively, the connector body 12 can include a material having a thermal expansion similar to borosilicate glass, i.e. about 5.5 ppm/° C.

As illustrated in FIG. 2, a plurality of conducting, connector pins 20, are shown which are disposed through pin-receiving apertures in the middle portion of the connector body 12. These pins 20 are also preferably made of the same metal as the connector body 12, for example, Kovar ® alloy, and are hermetically attached through the apertures by an insulating composition. The connector pins 20 are preferably sealed by melting or fusing a glass, such as a borosilicate glass, into the spaces around the pins 20 to produce highly reliable glass seals 26. Alternatively, a single glass preform having pin receiving holes therein can be placed into the connector body interior as a substitute for the metal through-hole section. The pins can then be fused into the glass preform upon heating. Glass sealing or fusion, as it is known in the art, consists of heating a glass mixture to a temperature of at least about 900° C., and ideally about 950° C., to produce, upon cooling, a hermetic bond between the pins 20 and the connector body 12 or a glass preform. This is a very highly reliable seal since Kovar ® has a coefficient of thermal expansion similar to that of the glass, which together with the glass, provides a gas-tight intergranular attachment around the connector pins 20 throughout a wide range of temperatures.

The flange means of this invention, generally represented by composite flange 21, comprises an upper flange 14 and lower flange 16 metallurgically bonded together to form joint 18. The upper flange 14 preferably contains a metallic composition which is compatible with the base metal of the connector body 12. Preferably, the coefficients of thermal expansion for alloys of the upper flange 14 and the connector body differ by less than about 5 ppm/° C., and more preferably, differ by less than about 10 % of the coefficient of the connector body alloy. Most importantly these alloys are compatible to allow fusion welding with a narrow HAZ. Ideally, the upper flange 14 includes a substantially similar base metal as connector body 12, for example, Kovar ®. The upper flange 14 is preferably hermetically bonded to the connector body 12 with a fusion weld having a HAZ which does not significantly affect the hermeticity provided by the insulating composition, or glass seals 26, which bond the connector pins 20 to the connector body 12. Such low HAZ fusion welding processes include, for example, plasma, electron beam, and laser welding techniques, which are known in the art.

In a preferred method of manufacturing the electrical connectors of this invention, the upper flange 14 is laser welded to the connector body 12, using known laser welding processes and equipment, following the glass sealing operation. This can be accomplished through the application of a small local laser spot which produces a metallurgical fusion weld in a small local area at the joint between the upper flange 14 and the connector body 12.

In an important aspect of this invention, the laser melt heat is restricted to the joint area, which is preferably, is less than about 1 mm at its widest point, and more preferably less than about 0.33-0.5 mm in width and depth. The weld path of the laser is moved, after the initial starting point, to produce a thin continuous and reliable laser welded joint 22 around the connector body. This process does not produce heating of the metallurgical joint 18 or the glass seals 26. Accordingly, thermal stresses at these critical hermetic sealing areas are thus avoided. Thus, both the laser welded joint 22, the glass to metal seals 26, and the integrity of the composite flange 21 can be hermetic and highly reliable.

The lower flange 16 of the composite flange 21 preferably contains a second metallic composition which is weldable to the microelectronic package housing 23. Typically, the choice of alloy will be compatible with the alloy of the housing 23, preferably, the differences in between the thermal conductivity of the lower flange 16 and the housing 23 are less than 5 ppm/° C., or less than 10% of the coefficient of the housing 23, and most preferably the alloys are substantially similar. Good choices for both the housing 23 and the lower flange 16 include aluminum, for its low weight and good thermal conductivity (coefficient of thermal expansion of about 24 ppm/° C.), brass or copper, for their solderability and good thermal conductivity (coefficient of thermal expansion of about 18 ppm/° C.), titanium, for its high strength to weight ratio (coefficient of thermal expansion of about 10 ppm/° C.), and stainless steel (preferably, 400 series), for its high strength and good corrosion resistance (coefficient of thermal expansion of about 14 ppm/° C.). In certain situations these alloy selections could also be used for the connector body 12 and pins 20.

In a preferred detailed embodiment of this invention, the microelectronic package housing includes 6061 aluminum, and the lower flange includes 4047 aluminum. The lower flange and microelectronic package housing are preferably fusion welded with a low HAZ welding technique, and most preferably, by laser welding.

The metallurgical bond 18 between the upper and lower flanges 14 and 16, respectively, of this invention, is ideally the result of a cladding technique. One common technique is to metallurgically bond an aluminum plate to a steel or Kovar ® plate with an explosive charge. Such a technique is known as explosive bonding or cladding and is described in U.S. Pat. Nos. 3,233,312; 3,397,444; and 3,493,353, which are hereby incorporated herein by reference. A wide variety of dissimilar metals may be bonded together in this manner without the constraints imposed by other bonding methods which require compatibility between the materials. The resulting laminate exhibits a bonding zone which includes multi-component, inter-atomic mixtures of the metals of the two dissimilar materials. Such explosion cladded materials have been known to exhibit a shear strength of greater than about 75% of the weaker metal in the composite.

Figure 4:
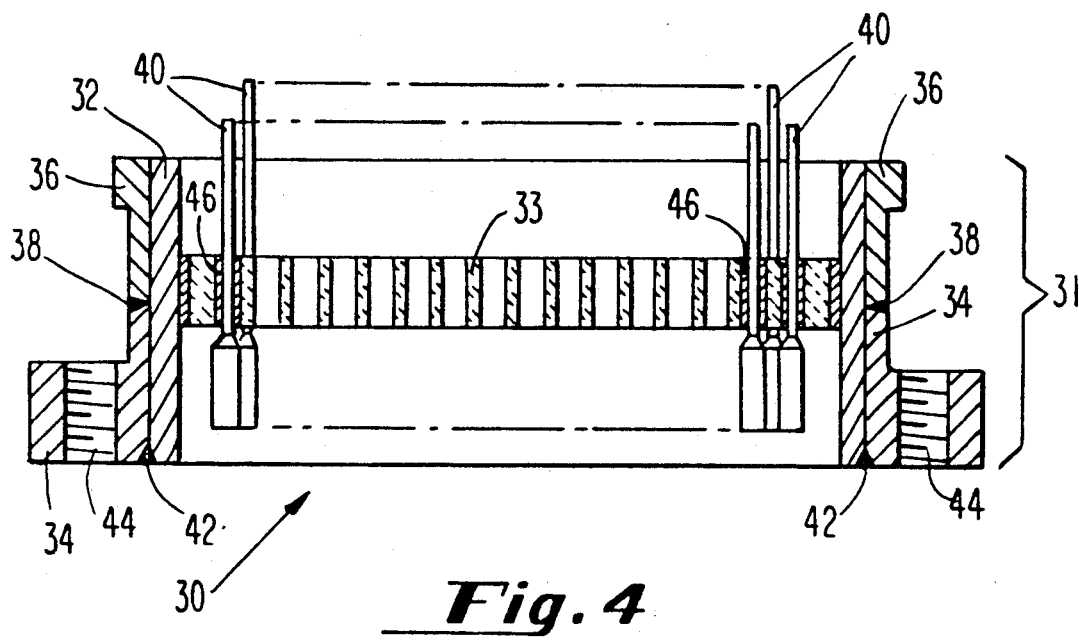
FIG. 4: is a side cross-sectional view of an alternative embodiment electrical connector having a ceramic insulating member.
Figure 5:
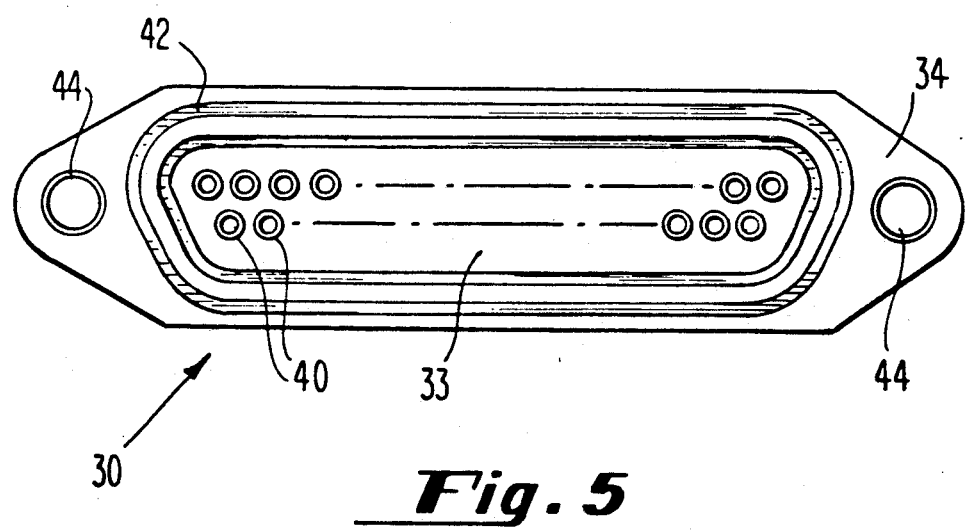
FIG. 5: is a top plan view cf the alternative embodiment of FIG. 4.

In an alternative embodiment of this invention described in FIGS. 4 and 5, an electrical connector 30 is provided having a single insulating body 33, preferably a ceramic or glass preform, disposed in a cavity of the connector body 32 and hermetically bonded thereto. In this embodiment, preferred Kovar ® or 52 Alloy connector pins 40 are disposed through a plurality of pin receiving holes in the insulating body 33. If a ceramic preform is employed, a preferred high temperature braze is used to bond to the metalized surfaces of the ceramic to form hermetic seals 46 between the connector pins 40 and the ceramic, as well as between the ceramic and the connector body 32. If a solid glass preform is used, the connector pins 40 are inserted into the preform holes and then fused with the glass at high temperatures to form hermetic seals 46. As with the embodiment of FIG. 1, the connector body is preferably a low expansion alloy compatible with ceramic and glass, such as Kovar ® alloy. The connector body 32 of this embodiment can conveniently be laser welded to the clad flange 31 with a laser welded joint 42. The clad flange can include an upper flange made of Kovar ® alloy and a lower flange 36 made of aluminum, preferably 4047 aluminum. The upper and lower flanges 34 and 36 respectively, can be explosion cladded to form metallurgical bond 38 as earlier described.

Connector embodiment 30 employs a clad flange 31 which has a slightly different configuration than the composite flange 21. As described in FIG. 4, the upper flange portion 34 of the clad flange 31 includes threaded holes 44 and the connector body 32 is disposed concentrically within the clad flange 31 and laser welded along the lower seam. Nevertheless, the fundamental concepts and principles of this invention are equally applicable to this embodiment.

From the foregoing, it can be realized that this invention provides highly reliable hermetic connectors which provide for compatibility between microelectronic aluminum package housings and Kovar ® alloy connector bodies here-to-fore not achievable. Low HAZ welding techniques are employed to avoid breaking hermetic glass seals around the connector pins. Additionally, explosion clad flange members provide adequate compatibility between housing alloys and connector body alloys for enabling highly reliable, laser welding of these members. Although various embodiments have been illustrated, this was for the purpose of describing, but not limiting the invention. Various modifications, which will become apparent to one skilled in the art, are within the scope of this invention described in the attached claims.

What is claimed is:

1. An electrical connector suitable for providing electrical access through a sidewall of a microelectronic package housing while maintaining hermeticity, said housing having a first coefficient of thermal expansion, comprising:
    a connector body having an aperture therethrough and a second coefficient of thermal expansion,
    a connector pin disposed through said aperture and hermetically sealed to said connector body with an insulating composition,
    flange means for joining said hermetic electrical connector to said microelectronic package housing, said flange means comprising upper and lower flanges metallurgically bonded together and comprising first and second metallic compositions respectively, said first composition being hermetically bonded to said connector body with a fusion weld having a heat-affected-zone which does not significantly affect the hermeticity provided by said insulating composition and said second composition being weldable to said microelectronic package housing.

2. The connector of claim 1, wherein said second coefficient of thermal expansion is substantially different than said first coefficient of thermal expansion of said housing.

3. The connector of claim 2, wherein said first and second coefficients of thermal expansion differ by more than about 5 ppm/° C. from one another.

4. The connector of claim 2, wherein said connector body cannot be readily fusion welded to said housing.

5. The connector of claim 2, wherein said insulating composition comprises a glass having a coefficient of thermal expansion which is within about 5 ppm/° C. from said second coefficient of thermal expansion.

6. The connector of claim 2, wherein said insulating composition comprises a glass having a coefficient of thermal expansion which is within about 10% of said second coefficient of thermal expansion.

7. The connector of claim 6, wherein said second metallic composition has a coefficient of thermal expansion which is within about 5 ppm/° C. from said first coefficient of thermal expansion of said housing.

8. The connector of claim 6, wherein said second metallic composition has a coefficient of thermal expansion which is within about 10% of said first coefficient of thermal expansion of said housing.

9. The connector of claim 8, wherein said first metallic composition has a coefficient of thermal expansion which is within about 5 ppm/° C. from said second coefficient of thermal expansion of said connector body.

10. The connector of claim 8, wherein said first metallic composition has a coefficient of thermal expansion which is within about 10% of said second coefficient of thermal expansion of said connector body.

11. The connector of claim 1, wherein said first metallic composition and said connector body comprise a first common metal, and said second metallic composition and said housing comprise a second common metal, said first and second common metals having substantially different coefficients of thermal expansion.

12. The connector of claim 1, wherein said upper and lower flanges are cladded to one another.

13. The connector of claim 1, wherein said first metallic composition and said connector body contain alloys having a substantially similar composition, and said second metallic composition and said housing contain alloys having a substantially similar composition, said first metallic composition being not readily fusion weldable to said housing.

14. The connector of claim 13, wherein said first and second flanges are explosion cladded to one another to form said flange means.

15. A method of manufacturing a hermetic electrical connector, comprising:
(a) providing a connector body having an aperture therethrough;
(b) disposing a connector pin through said aperture;
(c) hermetically sealing said connector pin to said connector body with an insulating composition;
(d) providing a flange means for joining said hermetic electrical connector to a microelectronic package housing, said flange means comprising upper and lower flanges metallurgically bonded together and comprising first and second metallic compositions respectively, said first composition being weldable to said connector body and said second composition being weldable to said microelectronic package housing; and
(e) welding said upper flange to said connector body with a low heat affected zone welding technique.

16. The method of claim 15, wherein said hermetic sealing step comprises fusing a glass between said connector pin and said connector body.

17. The method of claim 16, wherein said fusing step is conducted at a temperature of at least about 900° C.

18. The method of claim 15, wherein said providing step (d) comprises providing first and second metallic compositions having a difference in their respective coefficients of thermal expansion of at least about 5 ppm/°C.

19. The method of claim 15, wherein said providing step (d) comprises cladding said upper and lower flanges to one another.

20. The method of claim 19, wherein said cladding step comprises explosion cladding.

21. The method of claim 15, wherein said welding step comprises laser welding.

22. A hermetic electrical connector assembly, comprising:
an aluminum-containing housing having a receiving window therein,
a connector comprising an iron-based alloy connector body, a plurality of connector pins hermetically sealed with an insulating glass to said connector body through a plurality of apertures disposed through said body, an iron-based alloy upper flange member fusion welded to said connector body with a heat-affected zone of less than about 1 mm, an aluminum-containing lower flange member explosion cladded to said upper flange member, said connector hermetically bonded to said housing by at least a fusion weld.

23. An electrical connector suitable for providing electrical access through a sidewall of a microelectronic package housing while maintaining hermeticity, said housing having a first coefficient of thermal expansion, comprising:
a connector body having an cavity therethrough and a second coefficient of thermal expansion,
an insulating body having a pin receiving hole therein, said insulating body hermetically sealed to said connector body and disposed substantially within said cavity,
a connector pin disposed through said pin receiving hole and hermetically sealed to said insulating body,
flange means for joining said hermetic electrical connector to said microelectronic package housing, said flange means comprising upper and lower flanges metallurgically bonded together and comprising first and second metallic compositions respectively, said first composition being hermetically bonded to said connector body with a fusion weld having a heat-affected-zone which does not significantly affect the hermeticity between said connector pin and said insulating body and said second composition being weldable to said microelectronic package housing.

24. The connector of claim 23, wherein said insulating body comprises a ceramic which is hermetically brazed to said connector body and said connector pin.

25. The connector of claim 23, wherein said insulating body comprises a ceramic having a metallic surface thereon and said connector pin and said connector body are hermetically brazed to said metallic surface.

26. The connector of claim 23, wherein said flange means is fusion welded circumferentially around said connector body.

27. The connector of claim 23, wherein said insulating body is a glass.

* * * * *

REEXAMINATION CERTIFICATE (2401st)
United States Patent [19]
Rapoza

[11] B1 5,110,307
[45] Certificate Issued   Sep. 20, 1994

[54] LASER WELDABLE HERMETIC CONNECTOR

[75] Inventor: Edward J. Rapoza, West Milford, N.J.

[73] Assignee: Balo Precision Parts Inc., Butler, N.J.

Reexamination Request:
No. 90/003,059, May 17, 1993

Reexamination Certificate for:
Patent No.: 5,110,307
Issued: May 5, 1992
Appl. No.: 727,668
Filed: Jul. 9, 1991

[51] Int. Cl.$^5$ .................................... H01R 13/74
[52] U.S. Cl. ......................... 439/566; 174/152 GM; 29/843
[58] Field of Search .................. 439/566; 29/842, 843; 174/50, 61, 151, 152 GM

[56] References Cited

U.S. PATENT DOCUMENTS

| | | | |
|---|---|---|---|
| 3,901,772 | 8/1975 | Guillotin et al. | 174/152 GM X |
| 4,128,697 | 12/1978 | Simpson | 174/152 GM X |
| 4,657,337 | 4/1987 | Kyle | 174/152 GM X |
| 4,690,480 | 9/1987 | Snow et al. | 439/364 |
| 5,041,019 | 8/1991 | Sharp et al. | 439/559 |

OTHER PUBLICATIONS

"Laser Beam Welding", ASM Committee on Laser Beam Welding, *Metals Handbook Ninth Edition*, vol. 6: Welding, Brazing, and Soldering, 1983.

"Mechanical Properties, Fracture Toughnesses and Microstructures of Laser Welds of High Strength Alloys", E. A. Metzbower et al., *Source Book on Electron Beam and Laser Welding*, Schwartz, ed., 1981, pp. 369–386.

"Design for laser beam welding", John R. Shewell, *Source Book on Electron Beam and Laser Welding*, Schwartz, ed., 1981, pp. 319–323.

"The Most Powerful Name in Metal Fabrication Technology", Explosive Fabricators, Inc. trade literature, Jul., 1989.

"Joining Ceramics to Metals and Other Materials", H. E. Pattee, *Source Book on Brazing and Brazing Technology*, Schwartz, ed., 1980, pp. 315, 337–349.

*Primary Examiner*—Eugene F. Desmond

[57] ABSTRACT

Electrical connectors are provided for enabling electrical access through a side wall of a microelectronic, sensor, or fiber optic package housing while maintaining hermeticity. These connectors include a connector body having an aperture therethrough and a coefficient of thermal expansion which is different than that of the housing. The connectors include a connector pin disposed through the aperture of the connector body and hermetically sealed to the connector body with an insulating composition or a ceramic insert bonded to the connector pin. Flange means are also provided for joining the hermetic electrical connector to the microelectronic package housing. The flange means includes upper and lower flanges metallurgically bonded together and comprising first and second metallic compositions respectively. The first composition is hermetically bonded to the connector body with a fusion weld having a heat-affected-zone which does not significantly affect the hermetic seals around the connector pins. The second metallic composition is readily weldable to the microelectronic package housing to provide the final hermetic coupling.

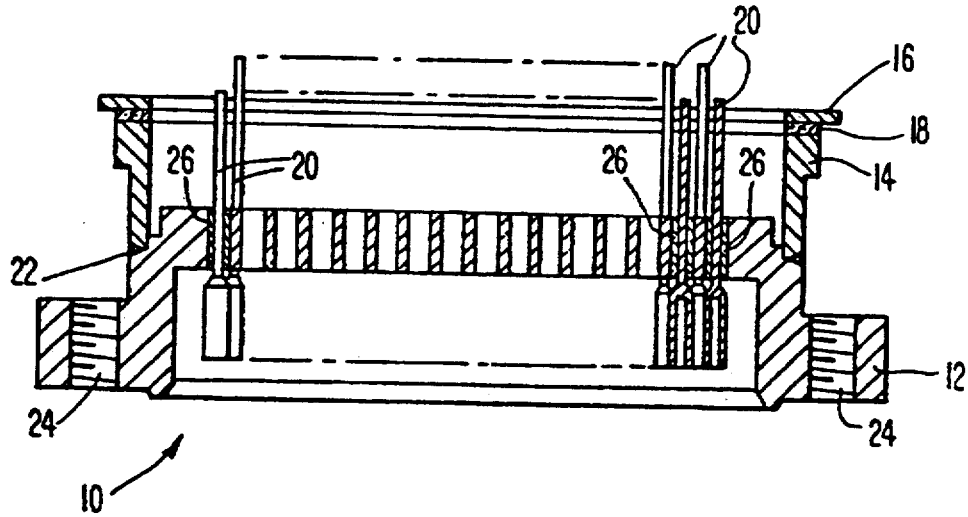

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-27 is confirmed.

* * * * *